J. BECK.
MODE OF COLORING AND TINTING RUBBER GOODS.
No. 90,335. Patented May 25, 1869.
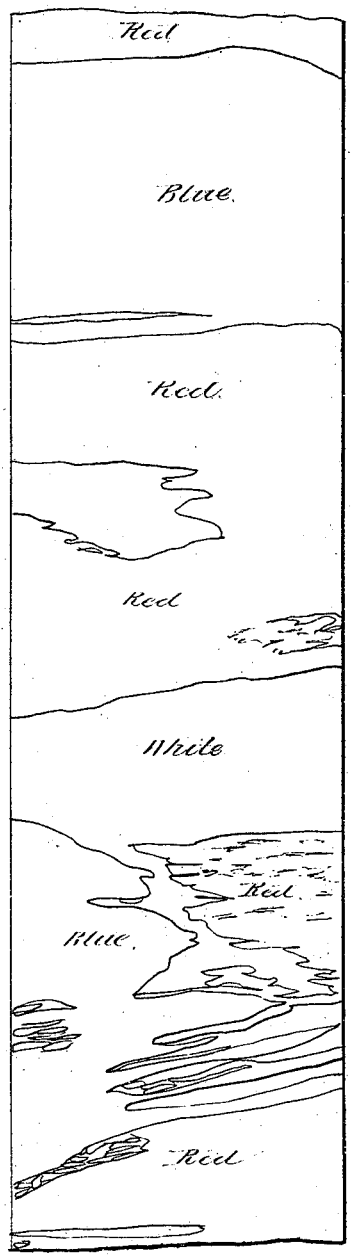
WITNESSES:
INVENTOR:
Joseph Beck

United States Patent Office.

JOSEPH BECK, OF TRENTON, NEW JERSEY.

Letters Patent No. 90,335, dated May 25, 1869.

---

IMPROVED MODE OF COLORING AND TINTING RUBBER GOODS.

---

The Schedule referred to in these Letters Patent and making part of the same.

---

*To all whom it may concern:*

Be it known that I, JOSEPH BECK, of Trenton, county of Mercer, and State of New Jersey, have invented a new and useful Mode of Coloring, Tinting, and Shading Sheets or Cloth of India Rubber, producing similar effect to graining on wood, producing a variety of colors or combination of colors; and I do hereby declare that the following is a full, clear, and exact description of the same, reference being had to the accompanying drawings, which are copies of sheet-rubber made in this manner.

The mixing and compounding of these colors I reserve for a future application for Letters Patent.

To enable others skilled in the art to make and use my invention, I will proceed to describe the manner of mixing the colors so as to produce the effect, while the sheets are being rolled out in the rolls.

The nature of my invention consists in mixing, or kneading any color desired with pure India rubber, the said rubber being kept at a temperature of 120° during the mixture, each color being mixed and kept separate, and then formed in rolls of any convenient size or length, say one and one-half inch in diameter and about thirty inches long.

Having the colors thus mixed, the workman selects such as he wishes to use, and throws them over his arm, or arranges them in any other convenient form or manner, and then placing himself in front of the calender, or rolls, (used in rolling India rubber into sheets,) he commences operations, by taking pieces from the various colors and placing them so that they will run through the rolls, adding, from time to time, the various colors, in greater or less quantity, and in different places, from right to left and left to right, according to his experience, taste, or the required pattern he wishes to produce, always keeping a sufficient amount in front of the rolls to make a continuous sheet.

Having thus fully described my invention for making sheets of variegated colored India rubber,

What I claim as new, and desire to secure by Letters Patent, is—

Forming sheets of India rubber of variegated colors, in the manner as above set forth.

JOSEPH BECK.

Witnesses:
   R. V. W. GUINON,
   G. D. DAVIS.